US009092578B2

(12) United States Patent
Wefers

(10) Patent No.: US 9,092,578 B2
(45) Date of Patent: Jul. 28, 2015

(54) AUTOMATED END-TO-END TESTING VIA MULTIPLE TEST TOOLS

(71) Applicant: Marcus Wefers, Heidelberg (DE)

(72) Inventor: Marcus Wefers, Heidelberg (DE)

(73) Assignee: SAP SE, Walldorf (DE)

( * ) Notice: Subject to any disclaimer, the term of this patent is extended or adjusted under 35 U.S.C. 154(b) by 195 days.

(21) Appl. No.: 13/721,480

(22) Filed: Dec. 20, 2012

(65) Prior Publication Data

US 2014/0181590 A1    Jun. 26, 2014

(51) Int. Cl.
*G06F 11/00*       (2006.01)
*G06F 11/36*       (2006.01)

(52) U.S. Cl.
CPC ........ *G06F 11/3688* (2013.01); *G06F 11/3696* (2013.01)

(58) Field of Classification Search
CPC ............ G06F 11/3672; G06F 11/3684; G06F 11/3688; G06F 11/3696
USPC ......... 714/32, 33, 38.1, 39, 45; 717/124, 125, 717/127, 131
See application file for complete search history.

(56) References Cited

U.S. PATENT DOCUMENTS 6,182,245 B1 * 1/2001 Akin et al. .................. 714/38.14
7,039,912 B1 * 5/2006 Moulden et al. .............. 718/100
2005/0086022 A1 * 4/2005 Lindberg et al. .............. 702/123
2007/0168744 A1 * 7/2007 Pal et al. ......................... 714/38
2008/0086660 A1 * 4/2008 Wefers ............................ 714/37
2011/0289489 A1 * 11/2011 Kumar et al. ................. 717/135

FOREIGN PATENT DOCUMENTS

WO    WO2012063070 A1 *  5/2012

OTHER PUBLICATIONS

U.S. Appl. No. 09/075,844, filed May 12, 1998, entitled "Integrated Computer Testing and Task Management Systems": Appendices A & B; pp. A1-A53 & B1-B25; 78 pages total.*

* cited by examiner

*Primary Examiner* — Joseph Kudirka
(74) *Attorney, Agent, or Firm* — Schwegman Lundberg & Woessner, P.A.

(57) ABSTRACT

The development of automated tests that span end-to-end business processes, such as may be executed in part by each of multiple Enterprise Resource Planning systems, is a very complex activity. Beside expert know-how of various tools, such end-to-end business process testing requires various test automation tools to cover complex business processes to provide automated tests. Various embodiments herein are built on an approach for building and connecting automated end-to-end tests that combines test scripts from multiple test tools. These embodiments include functionality to assemble test scripts from multiple test tools into a single, composite test script that allows passing of information between the test scripts during performance of an end-to-end automated process test. These and other embodiments are illustrated and described herein.

18 Claims, 5 Drawing Sheets

AUTOMATED END-TO-END TESTING VIA MULTIPLE TEST TOOLS

BACKGROUND INFORMATION

Testing software systems following implementation of the system itself or modifying a portion thereof creates risk exposure. To mitigate such risks, organizations often perform testing on systems once the changes are made. However, depending on the size of the system, testing can be laborious, expensive, and lengthy. Testing is therefore often skipped, limited, or performed using an automated test tool that executes test scripts.

When an automated test tool is utilized, a single automated test tool is used to test a particular system. However, in a typical modern organization that has integrated software systems that are built and exist on different computing platforms and are acquired from different software systems developers and developed organically by or for the organization, a single automated testing tool is generally not able to test all of the different integrated software systems. As a result, testing of processes that exist in part on more than one of the integrated systems, if performed on each of the integrated systems, is performed in a piecemeal manner according to multiple test scripts triggered independently.

DETAILED DESCRIPTION

Figure 1:
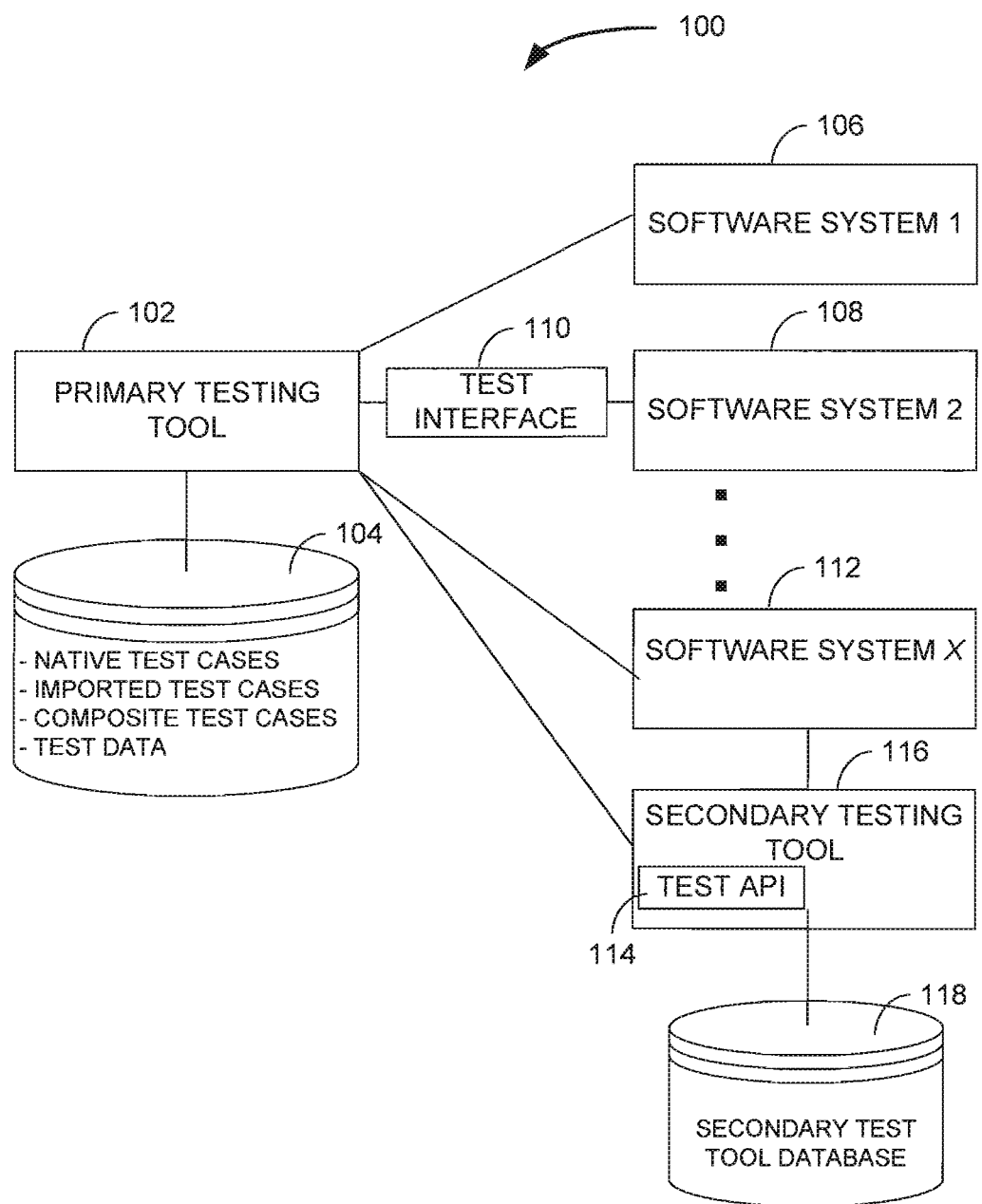
FIG. 1 is a logical block diagram of a system, according to an example embodiment.

Many organizations today utilize a variety of different systems in an integrated manner to perform data processing activities. Multiple of such systems are often involved in processing data of a single transaction, such as receiving, fulfilling, and shipping functions associated with a single product order. Such processing can generally be considered a single ordering process although subprocess thereof are executed and performed in different, distinct software systems. For example, one software system may receive the order, another software system may be involved in processing and fulfilling the order, and a further software system involved in the shipping of the order. Each of these systems may exist within and execute on a distinct computing platform and have been developed by a different software company. However, the processes of each system are but single components of a larger ordering process within the organization. To fully test the larger ordering process, such as to verify an update to one of the single components, testing just a single modified component is not sufficient to mitigate all risk exposure as that one component, or data processed or output thereby, interfaces with at least one other component. Thus, to mitigate all, or at least more, risk associated with such modifications, performance of an end-to-end test of the example ordering process should be performed.

However, as each of the single components of the larger, example ordering process is distinct in nature, different automated testing tools are often needed to perform such testing. Further, the testing output of one of the components may be needed as input for testing a next component in the ordering process. To facilitate such end-to-end testing of such processes that span a plurality of software systems, various embodiments herein include at least one of systems, methods, and software to generate and execute cross-test tool test plans and scripts that leverage test scripts of other testing tools in a centralized manner to provide end-to-end process testing capabilities.

The development of automated tests that span end-to-end business processes, such as may be executed in part by each of multiple Enterprise Resource Planning systems, is a very complex activity. Besides expert know-how of various tools, such end-to-end business process testing requires various test automation tools to cover complex business processes to provide automated tests.

Various embodiments herein are built on an approach for building and connecting automated end-to-end tests that combines test scripts from multiple test tools. These embodiments include functionality to assemble test scripts from multiple test tools into a single, composite test script that allows passing of information between the test scripts during performance of an end-to-end automated process test. These and other embodiments are illustrated and described herein.

In the following detailed description, reference is made to the accompanying drawings that form a part hereof, and in which is shown by way of illustration specific embodiments in which the inventive subject matter may be practiced. These embodiments are described in sufficient detail to enable those skilled in the art to practice them, and it is to be understood that other embodiments may be utilized and that structural, logical, and electrical changes may be made without departing from the scope of the inventive subject matter. Such embodiments of the inventive subject matter may be referred to, individually and/or collectively, herein by the term "invention" merely for convenience and without intending to voluntarily limit the scope of this application to any single invention or inventive concept if more than one is in fact disclosed.

The following description is, therefore, not to be taken in a limited sense, and the scope of the inventive subject matter is defined by the appended claims.

The functions or algorithms described herein are implemented in hardware, software or a combination of software and hardware in one embodiment. The software comprises computer executable instructions stored on computer readable media such as memory or other type of storage devices. Further, described functions may correspond to modules, which may be software, hardware, firmware, or any combination thereof. Multiple functions are performed in one or more modules as desired, and the embodiments described are merely examples. The software is executed on a digital signal processor, ASIC, microprocessor, or other type of processor operating on a system, such as a personal computer, server, a router, or other device capable of processing data including network interconnection devices.

Some embodiments implement the functions in two or more specific interconnected hardware modules or devices with related control and data signals communicated between and through the modules, or as portions of an application-specific integrated circuit. Thus, the exemplary process flow is applicable to software, firmware, and hardware implementations.

FIG. 1 is a logical block diagram of a system 100, according to an example embodiment. The system 100 includes a plurality of software systems 106, 108, 112 on which elements of a single process exist and execute. Each of the plurality of software systems 106, 108, 112 are distinct from one another at least to the extent that different portions of a single process are deployed to each. However, in a typical embodiment, each of the software systems 106, 108, 112 are from different software system development entities and therefore are typically not identical software systems. For example, software system 106 may be an Enterprise Resource Planning (ERP) system available from SAP AG of Waldorf, software system 108 may be a logistics-related software system available from a different company or developed organically by an entity utilizing the system 100, and the software system 112 may be a web-platform through which customers interact with the entity utilizing the system 100. As is readily apparent, each of the software systems 106, 108, 112 are quite different from one another and performing end-to-end testing of a process that spans each of the software systems 106, 108, 112 to date has been quite complex as each has unique aspects for testing.

The system 100 further includes a primary testing tool 102 and a secondary testing tool 116. The primary testing tool 102 is typically a testing tool that is compatible with at least one of the software systems 106, 108, 112 to perform automated testing according to test cases/scripts defined therein and stored in and retrievable from a database 104. (Note that references to test cases and test scripts herein are used synonymously, unless stated otherwise). For example, when the software system 106 is a software system available from SAP AG of Waldorf, Germany, the primary testing tool 102 may be the SAP Solution Manager tool. The secondary testing tool 116 may be virtually any other automated software testing tool, such as the HP QuickTest Professional (also known as HP QTP or just simply QTP) automated testing tool available from Hewlett-Packard Development Company, L.P. of Palo Alto, Calif. The software system 108 is not illustrated as having a dedicated secondary testing tool associated therewith. However, the software system 108 may have such as secondary testing tool in some embodiments, while in other embodiments, the primary testing tool 102 or the secondary testing tool 116 may be dedicated to servicing automated testing functions therefore.

Each of the primary testing tool 102 and the secondary testing tool 116 provide users abilities to author test cases that can be executed in an automated fashion. Such test cases are generally for testing smaller, siloed portions of a software system, such as a user interface, a path through a series of user interfaces, a process or string of processes that execute only within the bounds of a single software system under test. These test cases and any specific test data that may be needed to execute a particular test case are stored by the primary testing tool 102 and the secondary testing tool 116 in their own repositories, such as a primary testing tool 102 database 104 and a secondary testing tool 116 database 118.

The primary testing tool 102 of the system 100 includes an ability to communicate with other testing tools, such as the secondary testing tool 116. Communication between the primary testing tool and other testing tools may be direct according to a communication protocol shared by the primary testing tool 102 and one or more other testing tools or indirect. Indirect communication between the primary testing tool 102 and one or more other testing tools may be conducted via an application programming interface (API), such as test APT 114 of the secondary testing tool 116, an intermediary interface 110, such as test interface 110, or other data communication interface operable to connect the primary testing tool 102 with one or more other testing tools or software systems.

The primary testing tool 102, in some embodiments, includes functionality to natively author and store test cases with regard to software systems with which it is integrated, such as software system 106. The primary testing tool 102 is also able to import and store data representative of test cases defined in and stored by other testing tools, such as the secondary testing tool 116. The imported data of test cases of other testing tools may include data identifying test cases, test data associated or otherwise associable with those test cases, attributes and properties of the test cases, metadata of the test cases such as may provide information about which software system(s) and functionality thereof are tested by the test cases, and the like. The imported data of test cases is stored by the primary testing tool 102 in database 104, which operates as a test case repository. Test cases natively authored within the primary testing tool 102 and test cases imported from the other test tools are viewable and selectable within the primary testing tool 102. Further, some embodiments include abilities to modify test cases imported from other testing tools either within the primary testing tool 102 with changes stored back to the testing tool from which the test case was imported or by launching an application of the secondary testing tool 116 through which test cases of the secondary testing tool 116 are authored.

The primary testing tool 102 includes further functionality to create composite test cases. A composite test case is a test case that includes multiple other test cases that are stored or represented in the test case repository resident in the database 104. For example, a composite test case may include one or more test cases natively authored within the primary testing tool 102 and one or more test cases imported from one or more other software testing tools, such as the secondary testing tool 116. A composite test case author may search the test case repository for test cases, select test cases to add to the composite test case, and set an execution order of the test cases added to the composite test case. The execution order of test cases will typically be set to order test cases associated with process steps according to order of steps in a process to be tested by the composite test case. In some instances, an output of one test case is an input for one or more other test cases. Such data relations between test cases can be specified in a composite test case authored with the primary testing tool 102. Further, in some embodiments, when setting an execution order of the test cases within a composite test case, test cases may be designated as executable in parallel with one another, such as when a process includes portions that execute within two or more different software systems or where a single software system allows for parallel execution of test cases.

Additionally, some test cases defined within testing tools may include test data, attributes, and parameters that are utilized during execution to feed the test case or a portion of a software system being tested with information needed for execution. However, one or more of the test data, attributes, and parameters of a particular test case may not comport with a composite test case being authored. In such embodiments, the test case may be inherited and certain things overridden in an object-oriented programming-type manner. For example, a copy of a test case may be created and certain elements (instructions, test data, attributes, and properties) may be overridden. The copy of the test case and the modifications thereto will be stored at least in part in the test case repository of the database 104. However, when a test case is from another testing tool, the test case copy may be generated within a test case repository of the other testing tool, such as within the secondary testing tool 116 database 118.

The primary testing tool 102 is also able to execute composite test cases. A trigger input may be received with regard to a particular composite test case. The primary testing tool 102 may then retrieve data with regard to the particular composite test case and issue commands, which may also include arguments, to one or more of the software systems 106, 108, 112 directly or via another testing tool, such as the secondary testing tool 116, to cause the other testing tool to execute particular test cases included in the composite test case being executed. By executing a composite test case, the primary testing tool 102 is able to cross system boundaries that exist in processes many modern organizations to provide end-to-end processing testing capabilities.

Further, composite test cases, being modular in nature, provide for streamlined maintenance and development. First, if a portion of one or more of the software systems 106, 108, 112 is modified, only the test cases that test the modified portions need to be updated. If the modifications do not affect other portions of a process tested by a composite test case, no other test case changes need to be made. Instead, a composite test case that encompasses a test case of a modified system portion is typically able to just utilize the updated test case. An exception to that may be where a test case copy has been taken, as described above. However, such test cases can easily be identified within the test case repository in the primary testing tool database 102 and test case repositories of other testing tools, such as the secondary testing tool 116 database 118, such as through application of simple compare functions. With regard to newly developed or expanded portions of a process that is a subject of a composite test case, a new composite test case need not be created. Instead, test cases can be created for the newly developed or expanded portions of the process and added to the existing composite test case. Thus, not only do the system 100 and the composite test cases provide end-to-end process testing abilities across technical and system boundaries, the system 100 and composite test cases provide a highly flexible, easily maintainable solution.

In some further embodiments, the primary testing tool 102, rather than being a testing tool within which standard, non-composite test cases are authored, such as SAP Solution Manager and HP QTP, is instead an add-on module to such testing tools or a standalone software program that provides the end-to-end composite test case authoring and execution capabilities. As an add-on module or standalone program in such embodiments, the primary testing tool 102 is able to communicate with one or more secondary testing tools 116 to import test case data and guide execution of test cases therein.

Figure 2:
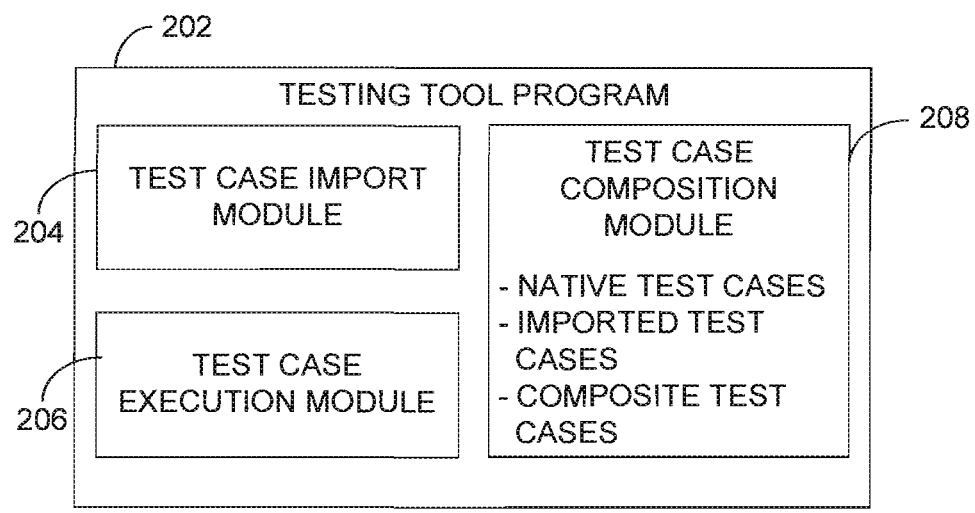
FIG. 2 is a logical block diagram of a testing tool program, according to an example embodiment.

FIG. 2 is a logical block diagram of a testing tool program 202, according to an example embodiment. The testing tool program 202 is an example of a program that may be utilized to author and execute test cases and composite test cases. The testing tool program 202 is also an example of program that may be implemented in the system 100 of FIG. 1 as the primary testing tool 102.

In some embodiments, the testing tool program 202 includes three modules. The three modules include a test case composition module 208, a test case import module 204, and a test case execution module 206.

The test case composition module 208 provides interfaces through which a user may view test cases in various forms. In some embodiments, the views include one or more of a test case listing, a test case detail view, a composite test case view, among others. Some such allow users to author, including modifying, test cases, including composite test cases. In the instance of viewing an imported test case, certain portions of the data may not be editable, such as portions that are only editable within a different testing tool in which the imported test case was authored. Some such views however may include a user interface control that can be selected when viewing an imported test case to view an interface in which the imported test case can be modified. In various embodiments, this interface may be an interface of the testing tool program 202 or an interface of the testing tool in which the imported test case was authored.

A composite test case view may be presented in several ways in different embodiments or according to user preferences. For example, some embodiments may include spatial representations of test cases included within a composite test case, such as in an expandable and collapsible tree view. Other embodiments may include graphical workflow type presentations. Yet others may simply include a listing of test cases included in a composite test case sortable by different data elements included in the test cases. The composite test case view may also include a search utility to search a test case repository for test cases to add to a composite test case. Test cases may be selected in such a utility for addition to a composite test case. Once test cases are added to a composite test case, an order can be assigned or modified. Such an order may be made in a drag-and-drop manner, but other mechanisms may also or alternatively be provided, such as a simple numbering and the like as would be readily apparent to a user interface developer of ordinary skill.

The composite test case view, in some embodiments, also provide user interface controls to associate output of one test case or a portion of a software system tested by a test case to be associated with input of another test case. In addition, a composite test case view may provide an option to associate a test dataset with the composite test case or one or more specific test cases included therein. Such a test dataset would be instantiated within a particular database or other data store as part of executing the composite test case or included test case.

Some further composite test case views may include an ability to associate attributes and parameters with a composite test case or one or more test cases included therein. Such attributes and parameters may include security credentials, a number of records to be retrieved, system under test options, user interface preferences, and the like. Some embodiments allow for such attributes and parameters to be specified in the composite test case even when they already exist in an included test case. In such an instance, the attribute or parameter specified in the composite test case will take precedence.

In some embodiments, the composite test case view may also allow for an associating with one or more test configurations. A test configuration is generally a data structure that will be consumed when a composite test case is executed. The data structure of a test configuration may identify application instances within one or more software systems the test cases of a composite test case is to execute against, security credentials for connecting to such software systems, and the like.

The test case import module 204 includes a utility for use in importing test cases from one or more other test tools. The test case import module 204 may provide a test tool browser view to allow a user to locate a test tool from which to view available test cases for import. The test case import module 204 may then allow importation of data representative of all test cases in a selected test tool or allow a user to view test cases available for import and to select which test cases to import. The test case import module 204 may then retrieve data representative of the test cases to be imported and store that data in a test case repository of the testing tool program 202.

The test case execution module 206 is operable to receive input to trigger execution of a test case or a composite test case, including execution of the test cases included within the composite test case. The test execution module in such instances may retrieve the data of the composite test case to be executed, the test cases included therein, and other data associated with the composite test case, such as a test configuration and test data. The test case execution module 206 will then set environmental variables for the composite test case to execute, such as loading test data in one or more software systems to be tested and then begin issuing commands to the various software systems to be tested according to an order of the test cases. As test cases complete execution, a log of test case execution results may be stored, such as in the test case repository or a log file stored elsewhere.

Figure 3:
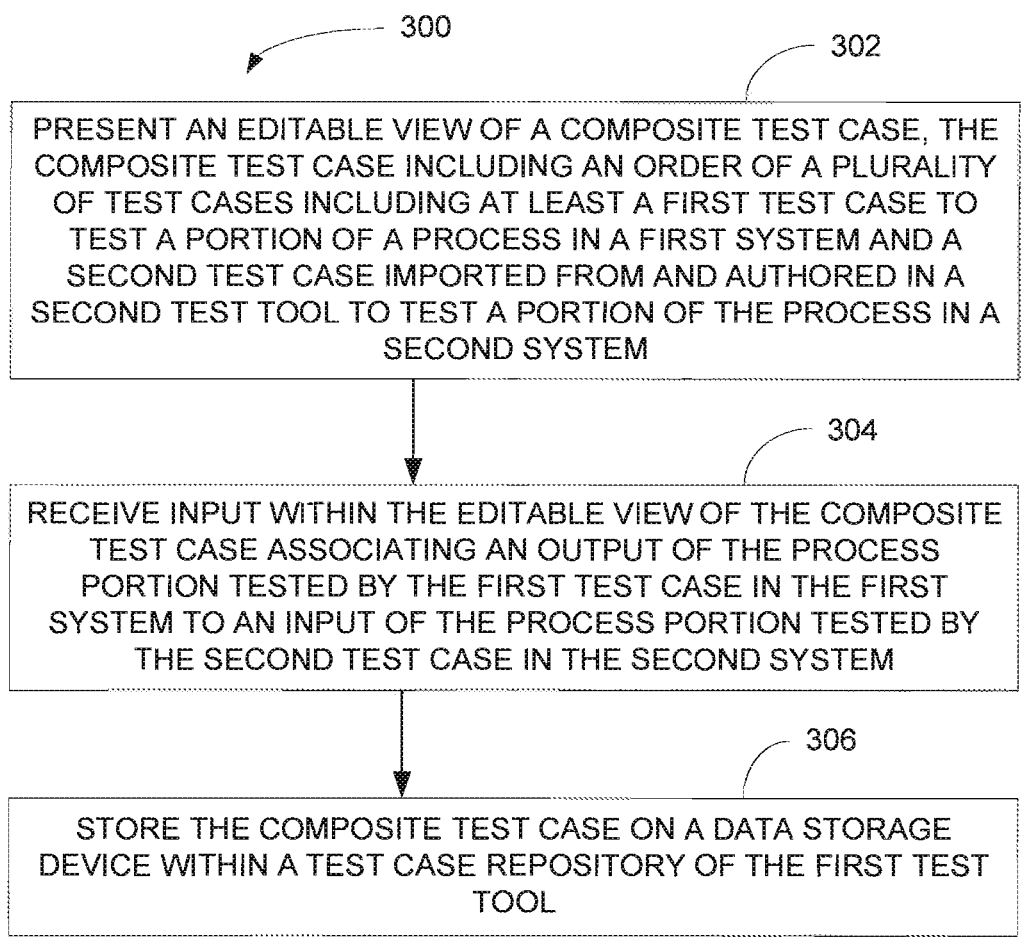
FIG. 3 is a block flow diagram of a method, according to an example embodiment.

FIG. 3 is a block flow diagram of a method 300, according to an example embodiment. The method 300 is an example of a method performed by a first test tool in authoring of a composite test case. The method 300 in some embodiments includes presenting 302 an editable view of a composite test case. The composite test in such embodiments includes an order of a plurality of test cases. The plurality of test cases may include at least a first test case to test a portion of a process that executes on a first system and a second test case imported from and authored in a second test tool to test a portion of the process that executes on a second system. The first test case may have been authored within the first test tool, but in other embodiments, the first test tool is an add-on module to another test tool to facilitate authoring and execution of composite test cases.

The method 300 further includes receiving 304 input within the editable view of the composite test case. The received input may associate an output of the process portion tested by the first test case in the first system to an input of the process portion tested by the second test case in the second system. The composite test case may then be stored 306 on a data storage device within a test case repository of the first test tool.

In some embodiments, upon completion of execution of the first test case in the first system and according to the input received 304 within the editable view of the composite test case, data output by the process portion tested by the first test case is captured. Subsequently during execution of the composite test case, when issuing a command to the second system to cause the second system to test the portion of the process tested by the second test case, the captured data output by the process portion tested by the first test case is provided as input to the second test case.

Some embodiments of the method 300 further include importing data representative of the second test case from the second test tool into the first test tool. The data representative of the second test case may then be stored on the data storage device within the test case repository of the first test tool. This importing of data representative of the second test case is performed prior to adding the second test case to the composite test case.

Figure 4:
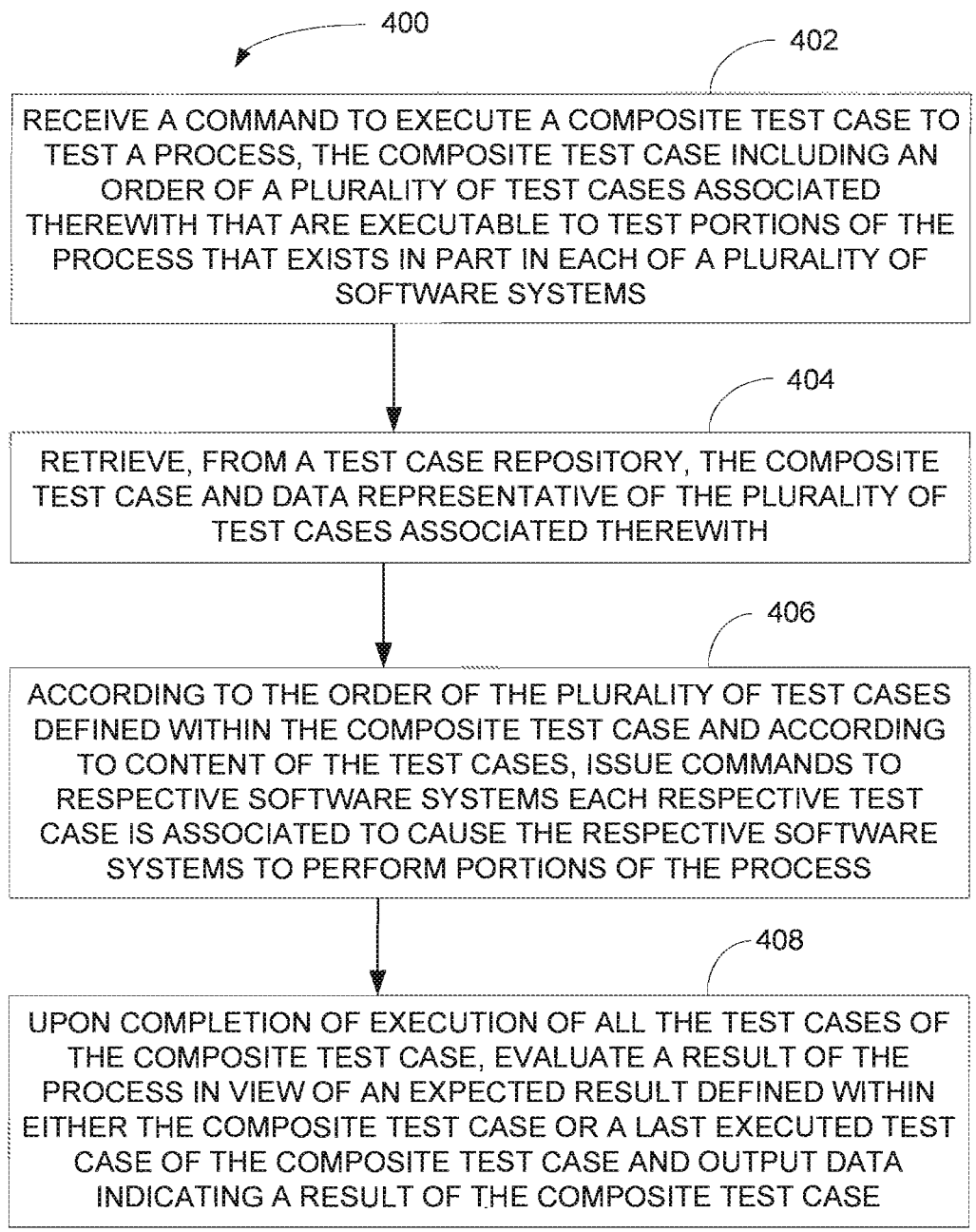
FIG. 4 is a block flow diagram of a method, according to an example embodiment.

Once a composite test case is authored and stored, the composite test case can be executed. FIG. 4 provides an example of a method 400 that may be performed to execute a composite test case.

FIG. 4 is a block flow diagram of a method 400, according to an example embodiment. Execution of a composite test case begins with a testing tool, such as the first testing tool, the test case repository of which in the composite test case is stored, receiving 402 trigger input to execute the composite test case. In response to the trigger input, the first test tool retrieves 404 the composite test case and the plurality of test cases including the first test case and the second test case from the test case repository. Then, according to the order of the plurality of test cases and content of the test cases, the first testing tool issues 406 commands to respective systems of each test case of the composite test case to cause the respective systems to test portions of the process. The commands to the respective systems may be sent directly to the target systems or indirectly via particular testing tools associated with the respective systems. A command in some instances may be a command to a particular test tool to execute a particular test case of the composite test case that exists in the particular target test tool.

In some embodiments, upon completion of execution of all the test cases of the composite test case, the method 400 includes evaluating a result of the tested process in view of an expected result. The expected result, in some embodiments, may be defined within either the composite test case or a last executed test case of the composite test case and output data indicating a result of the composite test case. In other embodiments, a result of the composite test case and test cases included therein may be written to a log and compared with expected results either defined within the test cases or presented to a user for review and manual determination.

In some embodiments of the method 400, prior to issuing 406 commands to cause test cases to be executed, a test configuration is retrieved. Such a test configuration includes at least one of data identifying instances of each of the plurality of software systems to be tested and security credentials to access the instances of the plurality of software systems to be tested. In some such embodiments, the test configuration to retrieve is identified in an argument received with the command to execute the composite test case. Once retrieved, the method 400 utilizes the test configuration to identify and set a state of the software systems against which the test cases of a composite test case are to execute.

In some embodiments, prior to issuing 406 commands to software systems to execute test cases, the commands are first encoded according to a unique application programming interface standard of the software system to which the commands are to be sent. This may include the testing tool performing the encoding, but may alternatively include interface objects that operate to translate commands from a protocol of the testing tool to a particular protocol or the unique application programming interface standard as need to communicate with a particular software system or testing tool associated therewith.

Figure 5:
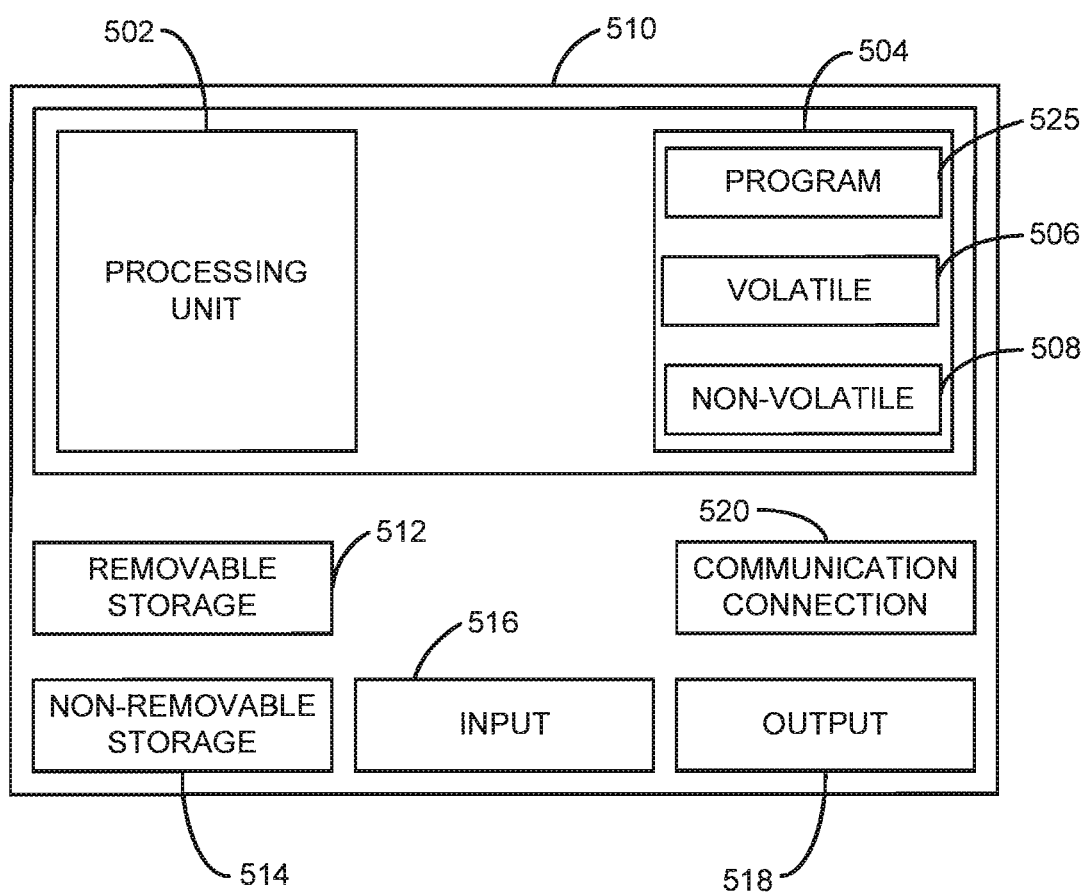
FIG. 5 is a block diagram of a computing device, according to an example embodiment.

FIG. 5 is a block diagram of a computing device, according to an example embodiment. In one embodiment, multiple such computer systems are utilized in a distributed network to implement multiple components in a transaction-based environment. An object-oriented, service-oriented, or other architecture may be used to implement such functions and communicate between the multiple systems and components. One example computing device in the form of a computer 510, may include a processing unit 502, memory 504, removable storage 512, and non-removable storage 514. Memory 504 may include volatile memory 506 and non-volatile memory 508. Computer 510 may include—or have access to a computing environment that includes—a variety of computer-readable media, such as volatile memory 506 and non-volatile memory 508, removable storage 512 and non-removable storage 514. Computer storage includes random access memory (RAM), read only memory (ROM), erasable programmable read-only memory (EPROM) & electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices, or any other medium capable of storing computer-readable instructions. Computer 510 may include or have access to a computing environment that includes input 516, output 518, and a communication connection 520. The computer may operate in a networked environment using a communication connection to connect to one or more remote computers, such as database servers. The remote computer may include a personal computer (PC), server, router, network PC, a peer device or other common network node, or the like. The communication connection may include a Local Area Network (LAN), a Wide Area Network (WAN) or other networks.

Computer-readable instructions stored on a computer-readable medium are executable by the processing unit 502 of the computer 510. A hard drive, CD-ROM, and RAM are some examples of articles including a non-transitory computer-readable medium. For example, a computer program 525 capable of performing one or more of the methods, or portions thereof, as illustrated and described herein, such as the primary testing tool 102 of FIG. 1 and 202 of FIG. 2.

It will be readily understood to those skilled in the art that various other changes in the details, material, and arrangements of the parts and method stages which have been described and illustrated in order to explain the nature of the inventive subject matter may be made without departing from the principles and scope of the inventive subject matter as expressed in the subjoined claims.

What is claimed is:

1. A method performed by a first test tool, the method comprising:
   presenting an editable view of a composite test case within the first test tool, the composite test case including an order of a plurality of test cases including at least a first test case to test a portion of a process in a first system, the first test case authored in the first test tool, and a second test case imported from and authored in a second test tool to test a portion of the process in a second system;
   receiving, within the first test tool, input to override, in an object oriented manner, at least one of a parameter and an attribute of a test case of one or both of the first and second test cases when the respective test case is executed;
   receiving, within the first test tool, input within the editable view of the composite test case associating an output of the process portion tested by the first test case in the first system to an input of the process portion tested by the second test case in the second system; and
   storing, by the first test tool, the composite test case on a data storage device within a test case repository of the first test tool.

2. The method of claim 1, further comprising:
   importing data representative of the second test case from the second test tool into the first test tool and storing the data representative of the second test case on the data storage device within the test case repository of the first test tool.

3. The method of claim 1, further comprising:
   receiving trigger input within the first test tool to execute the composite test case;
   in response to the trigger input, retrieving the composite test case and the plurality of test cases including the first test case and the second test case from the test case repository;
   according to the order of the plurality of test cases and content of the test cases, issuing commands to respective systems of each test case of the composite test case to cause the respective systems to perform portions of the process;
   upon completion of execution of the first test case in the first system and according to the input received within the editable view of the composite test case, capturing data output by the process portion tested by the first test case; and
   when issuing a command to the second system to cause the second system to test the portion of the process tested by the second test case, providing the captured data output by the process portion tested by the first test case as input.

4. The method of claim 1, wherein the first system and the second system are not identical systems and were developed by different software development entities.

5. The method of claim 1, further comprising:
   receiving input modifying content of a test case included within the composite test case;
   generating a copy the of the modified test case including the modification to the content; and
   storing the copy of the modified test case leaving the test case originally modified remaining as it was prior to the modification.

6. The method of claim 1, further comprising:
   receiving input associating the composite test case with a test configuration, the test configuration including at least one of data identifying instances of a plurality of systems to be tested and security credentials to access the instances of the plurality of systems to be tested.

7. A non-transitory computer-readable data storage device, with instructions stored thereon, which when executed by at least one processor of at least one computing device, cause the at least one computing device to:
   receive a command to execute a composite test case to test a process, the composite test case including an order of a plurality of test cases associated therewith that are executable to test portions of the process that exists in part in each of a plurality of software systems, at least one of the plurality of test cases authored in a program within which the composite test case was authored and executes;
   retrieve, from a test case repository, the composite test case and data representative of the plurality of test cases associated therewith, wherein the data representative of the plurality of test cases includes data with regard to at least one test case that includes data overriding at least one of a parameter, attribute, and instruction when the respective test case is executed;
   according to the order of the plurality of test cases defined within the composite test case and according to content of the test cases, issue commands to respective software systems each respective test case is associated to cause the respective software systems to perform portions of the process; and
   upon completion of execution of all the test cases of the composite test case, evaluate a result of the process in view of an expected result defined within either the composite test case or a last executed test case of the composite test case and output data indicating a result of the composite test case.

8. The non-transitory computer-readable data storage device of claim 7, wherein the instructions are further executable by the at least one processor of the at least one computing device to:
   retrieve a test configuration including at least one of data identifying instances of each of the plurality of software systems to be tested and security credentials to access the instances of the plurality of software systems to be tested.

9. The non-transitory computer-readable data storage device of claim 8, wherein the test configuration to retrieve is identified in an argument received with the command to execute the composite test case.

10. The non-transitory computer-readable data storage device of claim 7, wherein when issuing commands to the respective software systems, commands to at least one of the respective software systems are first encoded according to a unique application programming interface standard of the software system to which the commands are to be sent.

11. The non-transitory computer-readable data storage device of claim 7, wherein the composite test case includes data associating an output of a process portion tested by a first test case in a first software system to an input of a process portion tested by a second test case in the second software system.

12. The non-transitory computer-readable data storage device of claim 11, wherein the instructions are further executable by the at least one processor of the at least one computing device to:
  upon completion of execution of the first test case in the first software system and according to the data associating the output of the process portion tested by the first test case, capture data output by the process portion tested by the first test case; and
  when issuing a command to the software second system to cause the second software system to test the portion of the process tested by the second test case, provide the captured data output by the process portion tested by the first test case as input.

13. A system comprising:
  at least one computing device including at least one computer processor and at least one memory device; and
  a first test tool program stored on the at least one memory device and executable by the at least one computer processor of that at least one computing device to:
    present an editable view of a composite test case within a composite test case module of the first test tool program, the composite test case including an order of a plurality of test cases including at least a first test case, the first test case authored within a native test cases module of the first test tool program to test a portion of a process in the system and a second test case imported from and authored in a second test tool program to test a portion of the process in a second system;
    receive input to override, in an object oriented manner, at least one of a parameter and an attribute of a test case of one or both of the first and second test cases when the respective test case is executed;
    receive input within the editable view of the composite test case associating an output of the process portion tested by the first test case in the system to an input of the process portion tested by the second test case in the second system; and
    store the composite test case on the at least one memory device within a test case repository of the first test tool program.

14. The system of claim 13, further comprising:
  at least one network interface device; and
  wherein the editable view is presented through user interface data generated by the first test tool program and transmitted to a client over a network via the at least one network interface device.

15. The system of claim 13, further comprising:
  at least one network interface device; and
  wherein the first test tool program is further executable to:
    import, over a network via the at least one network interface device, data representative of the second test case from the second test tool program into the first test tool program and storing the data representative of the second test case on the at least one memory device within the test case repository of the first test tool program.

16. The system of claim 13, wherein the first test tool program is further executable to:
  receive trigger input within the first test tool program to execute the composite test case;
  in response to the trigger input, retrieve the composite test case and the plurality of test cases including the first test case and the second test case from the test case repository;
  according to the order of the plurality of test cases and content of the test cases, issue commands to respective systems of each test case of the composite test case to cause the respective systems to perform portions of the process;
  upon completion of execution of the first test case and according to the input received within the editable view of the composite test case, capture data output by the process portion tested by the first test case; and
  when issuing a command to the second system to cause the second system to test the portion of the process tested by the second test case, provide the captured data output by the process portion tested by the first test case as input.

17. The system of claim 13, wherein the first test tool program is further executable to:
  receive input modifying content of a test case included within the composite test case;
  generate a copy of the modified test case including the modification to the content; and
  store the copy of the modified test case leaving the test case originally modified remaining as it was prior to the modification.

18. The system of claim 13, wherein the first test tool program is further executable to:
  receive input associating the composite test case with a test configuration, the test configuration including at least one of data identifying instances of a plurality of systems to be tested and security credentials to access the instances of the plurality of systems to be tested.

* * * * *